（12） United States Patent
Nagahara et al.

(10) Patent No.: US 9,218,076 B2
(45) Date of Patent: Dec. 22, 2015

(54) ELECTRONIC DEVICE (71) Applicant: Alpine Electronics, Inc., Tokyo (JP)

(72) Inventors: Osamu Nagahara, Fukushima (JP); Futoshi Tomitsuka, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 355 days.

(21) Appl. No.: 13/793,141

(22) Filed: Mar. 11, 2013

(65) Prior Publication Data
US 2013/0265248 A1 Oct. 10, 2013

(30) Foreign Application Priority Data

Apr. 10, 2012 (JP) ................. 2012-089140

(51) Int. Cl.
G06F 3/041 (2006.01)
G06F 3/01 (2006.01)

(52) U.S. Cl.
CPC ............. *G06F 3/041* (2013.01); *G06F 3/011* (2013.01); *G06F 2203/04108* (2013.01)

(58) Field of Classification Search
CPC .. G06F 3/041; G06F 3/011; G06F 2203/04108
USPC .......................... 345/158, 173–184
See application file for complete search history.

(56) References Cited

U.S. PATENT DOCUMENTS

| | | | | |
|---|---|---|---|---|
| 8,553,002 B2* | 10/2013 | Homma | ............... | G06F 3/0488 345/168 |
| 2006/0161871 A1* | 7/2006 | Hotelling | ............. | G06F 3/0485 715/863 |
| 2008/0005703 A1* | 1/2008 | Radivojevic | .......... | G06F 1/1626 715/863 |
| 2008/0165140 A1* | 7/2008 | Christie | ............. | G06F 3/04883 345/173 |
| 2008/0225041 A1* | 9/2008 | El Dokor | ................ | G06F 3/011 345/419 |
| 2008/0297487 A1* | 12/2008 | Hotelling | ............. | G06F 1/3203 345/173 |
| 2009/0021491 A1* | 1/2009 | Kawamura | ............ | B60K 35/00 345/173 |
| 2010/0295781 A1* | 11/2010 | Alameh | ................ | G06F 3/0346 345/158 |
| 2011/0262002 A1* | 10/2011 | Lee | ......................... | G06F 3/011 382/103 |
| 2013/0201136 A1* | 8/2013 | Baard | ..................... | G06F 3/041 345/173 |

FOREIGN PATENT DOCUMENTS

JP 2009-216888 9/2009

OTHER PUBLICATIONS

Kinect Adventures, 2010.*

* cited by examiner

*Primary Examiner* — Kumar Patel
*Assistant Examiner* — Vinh Lam
(74) *Attorney, Agent, or Firm* — Brinks Gilson & Lione

(57) ABSTRACT

An electronic device includes a display and a proximity sensor arranged near a display surface of the display and configured to provide an output signal corresponding to a degree of proximity of an object to the display surface, and provides a position of the approaching object in a direction horizontal to the display surface. A user interface control unit has a first operational mode and a second operational mode, where in the first operation mode, the proximity of a user's hand from the display surface is monitored based on the output signal of the proximity sensor. In the second operational mode, a position of the user's hand in a direction horizontal to the display surface is detected within a detection target range and a user's operation is accepted according to the detected position of the user's hand.

15 Claims, 4 Drawing Sheets

ELECTRONIC DEVICE

PRIORITY CLAIM

This application claims the benefit of Japanese Patent Application No. 2012-089140 filed on Apr. 10, 2012, and which is incorporated by reference herein in its entirety.

BACKGROUND

1. Field of the invention

The present invention relates to controlling a user interface of an electronic device, which has a display.

2. Description of the Related Art

Techniques for controlling a user interface of an electronic device having a display are known, which include providing a touch panel and a proximity sensor together with the display, switching display content of the display to a user's operation accepting screen when the proximity sensor detects proximity of the user's hand to the display, and subsequently accepting the user's operation with respect to the screen using the touch panel (see Japanese Patent Application Laid-Open No. 2009-216888).

According to the above-described technique, the proximity sensor is used only to detect proximity of a user's hand to the display, and therefore an input device, such as a touch panel, must be provided at all times to accept a user's operation. However, if the proximity sensor can also be used to accept various user's operations, it is possible to provide additional features.

SUMMARY

It is therefore an object of certain embodiments of the present invention to provide an electronic device which can use a proximity sensor for both detecting proximity of a user's hand to a display and accepting a user's operation.

To achieve the above object, certain embodiments of the present invention provide an electronic device which includes a display; a proximity sensor arranged near a display surface of the display and configured to output an output signal matching a degree of proximity of an object to the display surface of the display and a position of the approaching object in a direction horizontal to the display surface of the display; and a user interface control unit. The term "horizontal" means a direction from left to right or right to left, or perpendicular thereto, moving in a direction of the plane of the surface of the screen. The user interface control unit includes operational modes of a first mode and a second mode, the first mode monitors the proximity of a user's hand within a first distance from the display surface of the display using the output signal of the proximity sensor and, when the proximity within the first distance occurs, changes a display state of the display and sets the second mode, and the second mode detects a position of the user's hand in a direction horizontal to the display surface of the display within a distance range as a detection target range in which a distance to the display surface of the display is equal to or less than a second distance that is shorter than the first distance, using the output signal of the proximity sensor, and accepts the user's operation according to the position of the detected hand or a change in the position.

The electronic device may be configured such that in the first mode, an initial state of the display is an operation stop state and, in the first mode, the user interface control unit activates the display when detecting the proximity of the user's hand within the first distance from the display surface of the display using the proximity sensor.

Further, the electronic device may be configured such that the user interface control unit in the first mode monitors the proximity of a user's hand within a first distance from the display surface of the display using the output signal of the proximity sensor and, when the proximity within the first distance occurs, displays a user's operation accepting screen on the display and sets the second mode, and in the second mode detects a position of the user's hand in a direction horizontal to the display surface of the display within a distance range as a detection target range in which a distance to the display surface of the display is equal to or less than a second distance shorter than the first distance using the output signal of the proximity sensor, and accepts the user's operation with respect to the user's operation accepting screen according to the position of the detected hand or a change in the position.

Furthermore, the electronic device may be configured such that, to display the user's operation accepting screen in this way, the proximity sensor outputs an output signal matching the degree of the proximity of the object to the display surface of the display and a position of the approaching object in left and right directions of the display surface of the display; and the user interface control unit displays a screen in which a button for accepting a user's selecting operation is arranged as the user's operation accepting screen, and, in the second mode, detects a position of the user's hand in the left and right directions of the display surface of the display using the output signal of the proximity sensor and, when the position of the detected hand in the left and right directions meets a display position of the button in the left and right directions, accepts the user's selecting operation with respect to the button meeting the display position.

Still further, the electronic device may be configured such that, to display the user's operation accepting screen in this way, the proximity sensor outputs an output signal matching the degree of the proximity of the object to the display surface of the display and a position of the approaching object in left and right directions of the display surface of the display; and the user interface control unit displays a screen in which an object for accepting a user's swiping operation is arranged as the user's operation accepting screen, and, in the second mode, detects a position of the user's hand in the left and right directions of the display surface of the display using the output signal of the proximity sensor and, when the position of the detected hand in the left and right directions changes in the left and right directions within a display range of the object in the left and right directions, accepts the user's swiping operation with respect to the object.

Moreover, the above electronic device may be configured such that an indication configured to indicate content of the user's operation accepted according to the position of the detected and or the change in the position is provided near the display screen of the display.

Further, the electronic device may be configured such that, in the second mode, the user interface control unit sets a sensitivity of the proximity sensor lower than a sensitivity in the first mode.

In addition, with the electronic device, for the proximity sensor, an infrared sensor, an ultrasonic sensor and an electromagnetic sensor can be used.

For example, the electronic device can be configured such that the proximity sensor is configured to include a plurality of infrared LEDs arranged spaced apart in a direction horizontal to the display surface of the display and a photosensor configured to detect reflected light of infrared light emitted from the LEDs, and, in the second mode, the user interface control unit detects a position of the user's hand in left and right directions of the display surface of the display using the output signal of the proximity sensor.

Alternatively, the electronic device can be configured such that the proximity sensor is configured to include four infrared LEDs arranged near four corners of the display surface of the display and a photosensor configured to detect reflected light of infrared light emitted from the LEDs, and, in the second mode, the user interface control unit detects a position of the user's hand in left and right directions and up and down directions of the display surface of the display using the output signal of the proximity sensor.

In addition, the electronic device may be configured to further have a touch panel arranged on the display surface of the display, and may be configured such that the user interface control unit also accepts the user's operation according to a user's touch operation with respect to the touch panel.

The electronic device can use the proximity sensor for both detecting proximity of the user's hand to the display and accepting the user's operation, so that it is not necessary to provide an input device such as a touch panel other than the proximity sensor at all times. Further, it is possible to provide more various user interfaces using the proximity sensor.

As described above, the present invention can use a proximity sensor for both detecting proximity of a user's hand to a display and accepting a user's operation.

DETAILED DESCRIPTION

Embodiments of the present invention will be described below.

Figure 1A:
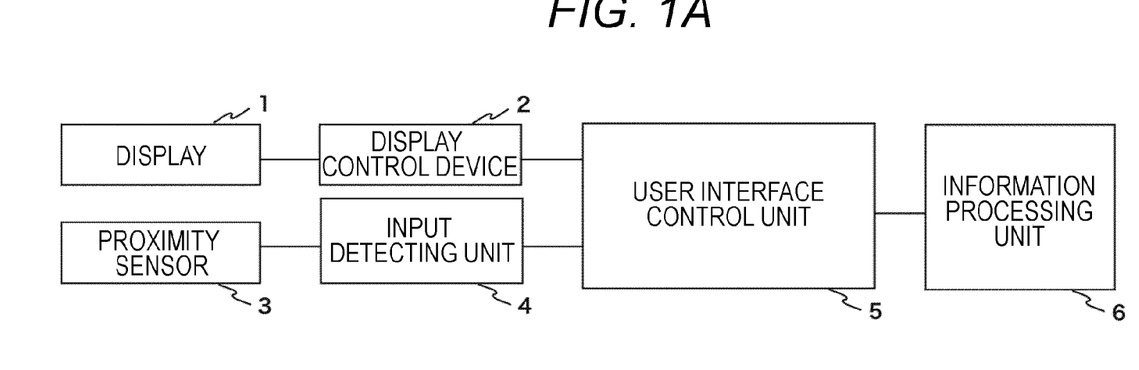
FIG. 1A is a block diagram illustrating a specific configuration of an electronic device according to an embodiment of the present invention.

FIG. 1A illustrates a configuration of an electronic device according to the one embodiment.

As illustrated in FIG. 1A, the electronic device has a display 1, a display control device 2, a proximity sensor 3, an input detecting unit 4, a user interface control unit 5 and an information processing unit 6.

Figure 1B:
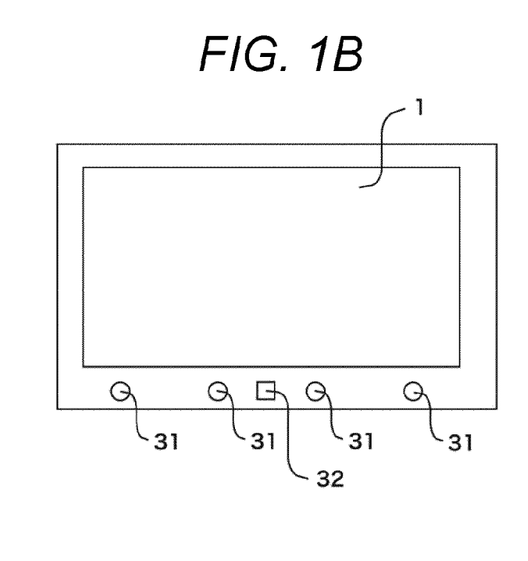
FIGS. 1B and 1C show embodiments of a display screen and sensors.

The proximity sensor 3 is a sensor which detects proximity of an object, and includes four infrared LEDs 31 and an infrared light photosensor 32 as illustrated in FIG. 1B.

Meanwhile, the four infrared LEDs 31 are arranged side by side in a horizontal direction at equal intervals at positions right below a display surface of the display 1. However, such LEDs, in some embodiments, may be arranged along any of the four edges of the screen, and need not necessarily lie in the left to right direction. Accordingly, the proximity sensor 3 may include the LEDs arranged in an up to down orientation. Also note that with respect to the term "horizontal" regarding movement of the user's hand, such term means movement in a direction from left to right or right to left, or perpendicular thereto, moving in a direction parallel to the plane of the surface of the screen. Further, the photosensor 32 is arranged at a position right below the display surface of the display 1 such that the position in the left and right directions meets the center position of the display surface of the display 1 in the left and right directions.

Next, the input detecting unit 4 performs processing of driving the proximity sensor 3 and detecting an output of the proximity sensor 3. Details of the driving and detection processing will be described below.

The user interface control unit 5 controls the display control device 2 and the input detecting unit 4 to perform processing of providing a user interface which uses the proximity sensor 3 for receiving an input, and the display 1 for showing an indication, to the information processing unit 6.

When, for example, the electronic device is an electronic device mounted on a car, the information processing unit 6 performs media playback and information processing, such as navigation processing and air conditioning control processing, and uses a user interface provided by the user interface control unit 5 to receive an input and provide an output to and from a user.

The electronic device may be configured using a computer which has a CPU and a memory and, in this case, functions of the user interface control unit 5 and the information processing unit 6, in one specific embodiment may be realized by a computer executing a predetermined program.

Figure 2:
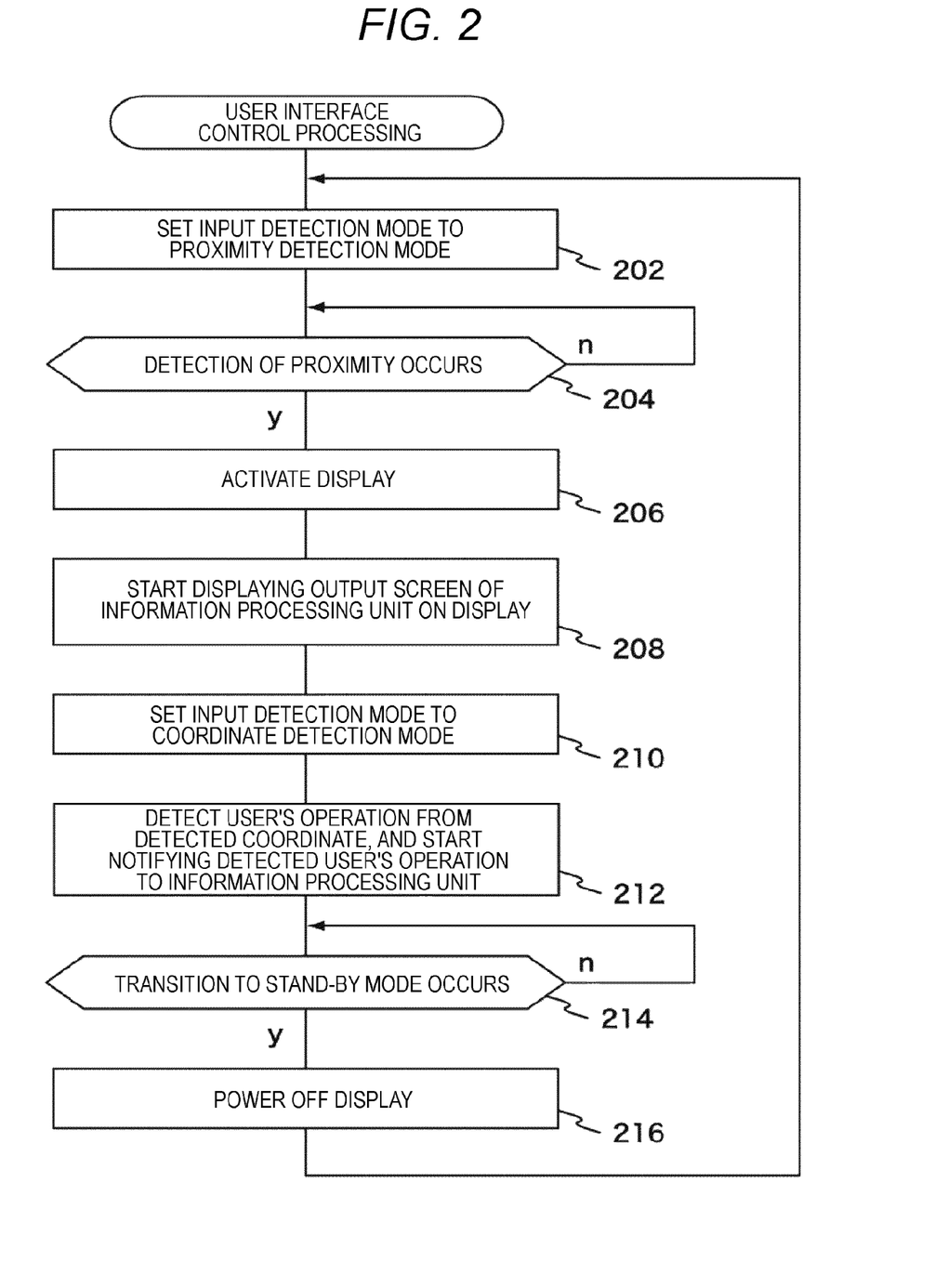
FIG. 2 is a flowchart illustrating user interface control processing according to embodiments of the present invention.

FIG. 2 illustrates procedure of user interface control processing performed by the user interface control unit 5 to provide such a user interface to the information processing unit 6.

The user interface control processing is processing started when the electronic device which is powered on is activated. In addition, upon activation of the electronic device, the display 1 is not activated (the display 1 is not powered on).

As illustrated in FIG. 2, the user interface control unit 5 first sets an input detection mode of the input detecting unit 4 to a proximity detection mode (step 202).

Meanwhile, an operation of the input detecting unit 4 when the input detection mode is set to the proximity detection mode will be described.

Figure 3A:
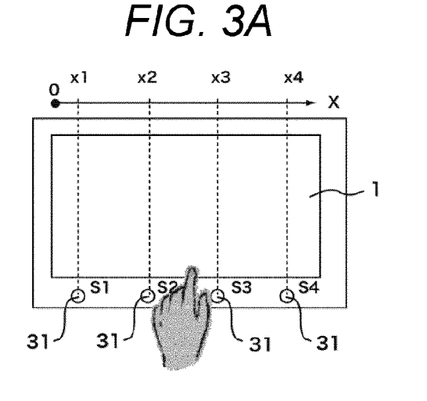
FIGS. 3A-3B illustrate a method of using a proximity sensor according to the embodiment of the present invention.

As illustrated in FIG. 3A, the four infrared LEDs 31 are indicated as S1, S2, S3 and S4 from the left and, in an X coordinate in which a left corner of the display 1 is the origin and the left and right directions of the display 1 are an X direction, coordinates of S1, S2, S3 and S4 are x1, x2, x3 and x4, respectively.

Figure 3B:
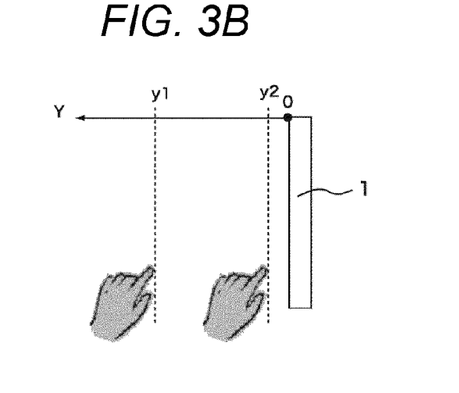

Further, as illustrated in FIG. 3B, a Y coordinate in which a display surface of the display 1 is the origin and front and rear directions of the display 1 are a Y direction is set, and a distance from the display surface of the display 1 to a user's hand is set to D.

Furthermore, when the input detection mode is the proximity detection mode, if the position of the user's hand in the Y direction comes close to y1 (y1 is, for example, 10 cm), that is, if D is y1 or less, the input detecting unit 4 detects proximity of the user and notifies occurrence of detection of proximity to the user interface control unit 5.

Figure 3C:
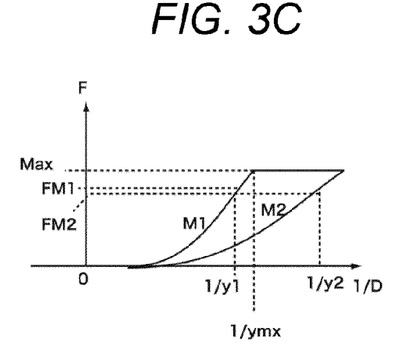
FIGS. 3C-3D show detection operation with respect to distance measurements.

That is, when the input detection mode is the proximity detection mode, the input detecting unit 4 sets the sensitivity of the proximity sensor 3 to performance indicated by M1 in FIG. 3C. FIG. 3C illustrates that the user's hand is in front of the vicinity of the lower end of the display surface of the display 1 and illustrates a relationship between the distance D to the user's hand and a signal intensity F obtained by amplifying by an amplifier of the input detecting unit 4 an infrared light intensity detected by the photosensor 32 in a state where one of the infrared LEDs 31 is lighted, and FM1 in FIG. 3C indicates the signal intensity F when the sensitivity of the proximity sensor 3 is set to the performance indicated by M1 and the distance D to the user's hand is y1. Further, upon setting of the sensitivity of this proximity sensor 3, the signal intensity F is saturated at a value Max (where Max>FM1) in a range of D>ymx (where ymx>y1), and a value does not change even if the user's hand comes close to the display 1 beyond ymx.

Meanwhile, the sensitivity is set by, for example, changing the emission intensity of the infrared LEDs 31 or the amplification factor of the amplifier which amplifies the infrared light intensity detected by the photosensor 32.

Figure 3D:
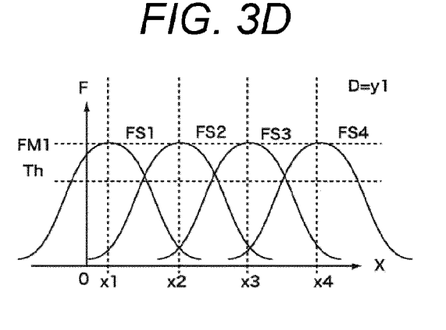

Meanwhile, FIG. 3D illustrates a relationship between the X coordinate of the user's hand and the signal intensity F when the sensitivity of the proximity sensor 3 is set to the performance indicated by M1 in FIG. 3C, and the distance D to the user's hand in front of the vicinity of the lower end of the display surface of the display 1 is y1. In addition, FSn in FIG. 3D indicates the signal intensity F obtained when only Sn of the infrared LED 31 is lighted.

As illustrated in FIG. 3D, in this case, the signal intensity F is a given value Th (where Th<FM1) or more irrespectively of the X coordinate of the user's hand and the lighted infrared LED 31.

Then, when the four infrared LEDs 31 are sequentially and cyclically lighted one by one for a short time, and a period in which the signal intensity F obtained by amplifying by the amplifier the infrared light intensity detected by the photosensor 32 while the infrared LED 31 is lighted is Th or more continues for a predetermined period (for example, 0.5 seconds) or more, the input detecting unit 4 detects proximity of the user, and notifies occurrence of detection of proximity to the user interface control unit 5.

Back to FIG. 2, when the input detecting unit 4 notifies occurrence of detection of proximity (step 204), the user interface control unit 5 activates the display 1 (powers on the display 1) (step 206).

Further, a screen which is requested by the information processing unit 6 to be displayed starts being displayed on the display 1 through the display control device 2 (step 208).

Furthermore, next, the input detection mode of the input detecting unit 4 is set to the coordinate detection mode (step 210).

Meanwhile, the operation of the input detecting unit 4 when the input detection mode is set to the coordinate detection mode will be described.

When the input detection mode is the coordinate detection mode, if the position of the user's hand in the Y direction comes close to y2 (y2 is, for example, 3 cm) or less, that is, if D is y2 or less, the input detecting unit 4 detects proximity of the user's hand to the X coordinate and notifies the detected X coordinate to the user interface control unit 5.

That is, when the input detection mode is the proximity detection mode, the input detecting unit 4 decreases the sensitivity of the proximity sensor 3 to performance indicated by M2 in FIG. 3C. Meanwhile, FM2 in FIG. 3C indicates the signal intensity F when the sensitivity of the proximity sensor 3 is set to the performance indicated by M2 and the distance D to the user's hand is y2. Further, even when the distance D to the user's hand is 0, that is, even when the finger of the user's hand contacts the display surface of the display 1, the sensitivity of this proximity sensor 3 is set such that the signal intensity F is not saturated.

Figure 3E:
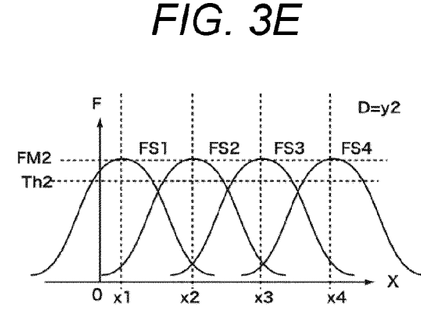
FIGS. 3E-3F illustrate a relationship between coordinate of a user's hand and signal intensity.

Meanwhile, FIG. 3E illustrates a relationship between the X coordinate of the user's hand and the signal intensity F when the sensitivity of the proximity sensor 3 is set to the performance indicated by M2 in FIG. 3C, and the distance D to the user's hand in front of the vicinity of the lower end of the display surface of the display 1 is y2. In addition, FSn in FIG. 3E indicates the signal intensity F obtained when only Sn of the infrared LED 31 is lighted.

As illustrated in FIG. 3E, in this case, the signal intensity F obtained when each infrared LED 31 is lighted varies depending on the X coordinate of the user's hand.

Then, while the four infrared LEDs 31 are sequentially and cyclically lighted one by one for a short time, the input detecting unit 4 calculates the X coordinate of the user's hand based on a combination of the signal intensity F obtained by amplifying by the amplifier the infrared light intensity detected by the photosensor 32 during the period in which the infrared LED 31 is lighted, and notifies the X coordinate to the user interface control unit 5. Meanwhile, in a certain period, the input detecting unit 4 may simply output as the X coordinate of the user's hand the X coordinate of the infrared LED 31 (one of x1-x4) lighted when the maximum signal intensity F exceeding Th2 set to a little smaller value than FM2 is obtained.

Figure 3F:
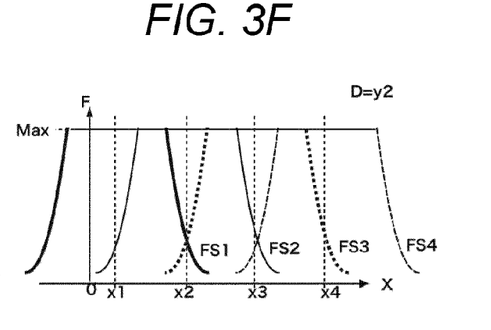

In addition, when the input detection mode is the proximity detection mode and the sensitivity of the proximity sensor 3 is decreased and set to have performance indicated by M2 in FIG. 3C such that the sensitivity of the proximity sensor 3 is kept to have a saturated region indicated by M1 in FIG. 3C, as FIG. 3F illustrates the relationship between the X coordinate of the user's hand and the signal intensity F when the sensitivity of the proximity sensor 3 is set to the performance indicated by M1 in FIG. 3C and the distance D to the user's hand in front of the vicinity of the lower end of the display surface of the display 1 is y2, the signal intensity F is saturated, and therefore the signal intensity F obtained when each infrared LED 31 is lighted does not necessarily vary depending on the X coordinate of the user's hand and there is a problem upon calculation of the X coordinate of the user's hand.

Back to FIG. 2, subsequently, until a transition to a stand-by mode occurs (step 214), the user's operation is detected from the coordinate detected by the input detecting unit 4, and the detected user's operation is notified to the information processing unit 6 (step 212). In addition, the transition to the stand-by mode may be configured to occur when a user's instruction to transition to the stand-by mode occurs, an operation is not inputted to the electronic device for more than a predetermined period or an instruction from the information processing unit 6 to transition to the stand-by mode occurs.

Meanwhile, FIG. 4 illustrates an example of a user's operation detected by the user interface control unit 5.

Figure 4A:
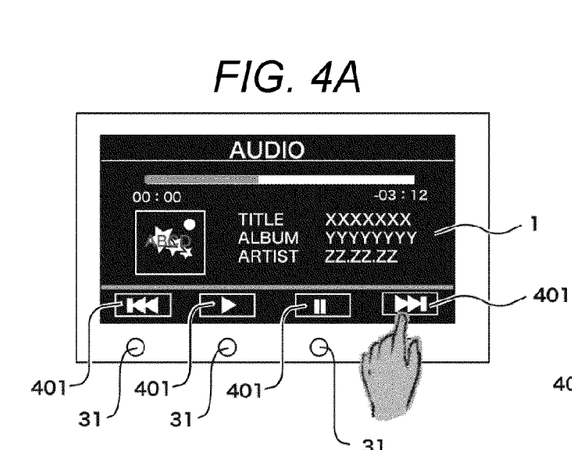
FIGS. 4A-4D are examples of accepting a user's operation according to embodiments of the present invention.

FIG. 4A illustrates an example where a screen displayed on the display 1 by the information processing unit 6 includes a plurality of buttons 401 for accepting user's selecting operations. In this case, as illustrated in FIG. 4A, the user selects the button 401 by positioning the finger on the button 401 or on an area below the button 401, and, when the coordinate detected by the input detecting unit 4 continues to be the coordinate within the X coordinate range of the display area of one of the buttons 401 for more than a predetermined period (for example, 0.3 seconds), the user interface control unit 5 detects occurrence of the selecting operation of the button 401 and notifies this occurrence to the information processing unit 6.

In addition, each button 401 and the X coordinate range of the display area of the button 401 are notified in advance from the information processing unit 6 to the user interface control unit 5 when the screen starts being displayed.

Figure 4B:
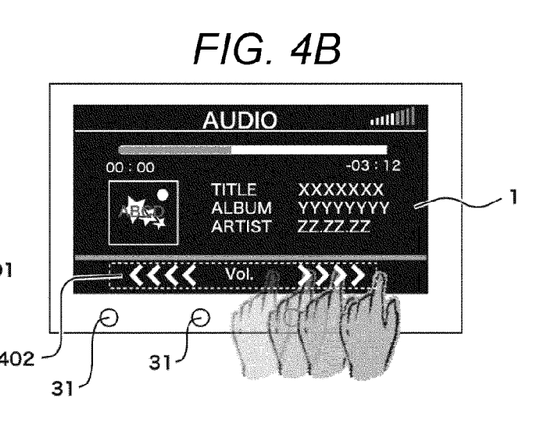

Further, FIG. 4B illustrates an example where the screen displayed on the display 1 by the information processing unit 6 includes a swipe object 402 for accepting a user's swiping operation. In this case, as illustrated in FIG. 4B, the user performs a swiping operation (an operation of increasing or decreasing the volume with the example illustrated in FIG. 4B) by swiping the swipe object 402 or an area below the swipe object 402 to the left and the right by the finger and, when the position indicated by the coordinate detected by the input detecting unit 4 moves sequentially in one of left and right directions within the X coordinate range of the display area of the swipe object 402, the user interface control unit 5 detects occurrence of the user's swiping operation of the swipe object 402, and notifies this occurrence to the information processing unit 6 together with the amount of movement and a moving direction.

In addition, the swipe object 402 and the X coordinate range of the display area of the swipe object 402 are notified in advance from the information processing unit 6 to the user interface control unit 5 when the screen starts being displayed.

Back to FIG. 2, when the transition to the stand-by mode occurs (step 214), the power of the display 1 is set to off (step 216) and the flow returns to processing from step 202.

The user interface control processing performed by the user interface control unit 5 has been described above.

The embodiment of the present invention has been described above.

As described above, according to the present embodiment, the proximity sensor 3 can be used for both detecting proximity of the user's hand to the display 1 and, in addition, accepting a user's operation, so that it is not necessary to provide the input device such the touch panel other than the proximity sensor 3 at all times. Further, it is possible to provide more various user interfaces using the proximity sensor 3.

Figure 1C:
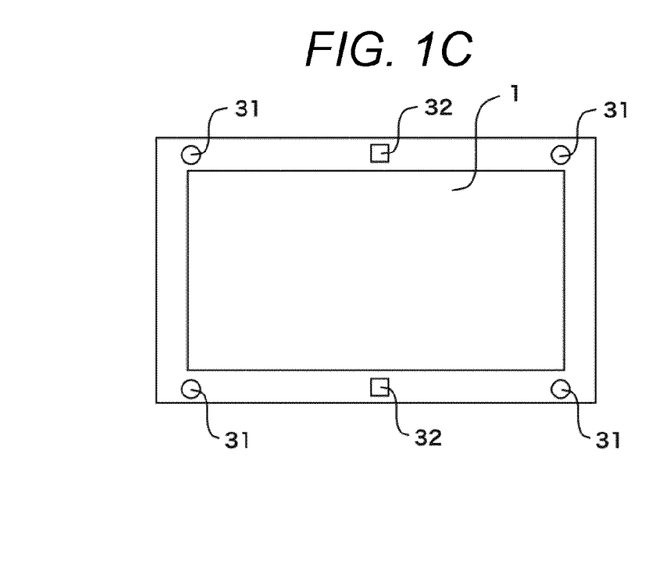

Although the above embodiment has been described using a case as an example where the infrared LEDs 31 and the photosensor 32 arranged directly below the display surface of the display 1 are provided as the proximity sensor 3 as illustrated in FIG. 1B, the number and an arrangement of the infrared LEDs 31 and the photosensors 32 to be used as the proximity sensor 3 may depend on other examples. That is, the four infrared LEDs 31 may be arranged near four corners of the display surface of the display 1 as illustrated in FIG. 1C, and the photosensors 32 may be arranged above and below the display surface. In addition, according to the arrangement in FIG. 1C, it is possible to detect a two-dimensional coordinate in left, right, up and down directions using the proximity sensor 3 in the coordinate detection mode.

Further, although the proximity sensor 3 which detects proximity using infrared light has been used in the above embodiment, various types of proximity sensors such as the proximity sensor 3 which detects proximity using a ultrasonic wave or the proximity sensor 3 which detects proximity using an electromagnetic wave which can easily adjust the sensitivity and adjust the maximum distance at which proximity can be detected according to the sensitivity from about 10 cm to several cm can be used likewise as the proximity sensor 3.

Furthermore, although, in the user interface control processing according to the above embodiment, the display 1 is not activated (the display 1 is not powered on) upon activation of the electronic device, the display 1 is activated (step 206) at a point of time when the input detecting unit 4 notifies occurrence of detection of proximity (step 204), and a screen which is requested by the information processing unit 6 to be displayed starts being displayed on the display 1 through the display control device 2 (step 208), this processing may be substituted with the following processing.

That is, the display 1 is activated upon activation of the electronic device, and a screen which is requested by the information processing unit 6 to be displayed starts being displayed on the display 1 through the display control device 2. Meanwhile, when the electronic device is activated, the information processing unit 6 displays on the display 1 a screen for presenting predetermined information processed by the information processing unit 6 to the user, a screen indicating a stand-by state or a screen which is a black-out screen for not accepting an operation through the user interface control unit 5. Further, according to the user interface control processing, when the input detecting unit 4 notifies occurrence of detection of proximity (step 204), and performs processing of notifying occurrence of detection of proximity to the information processing unit 6 instead of processing in steps 206 and 208.

Meanwhile, the information processing unit 6 which has received this notice changes the screen to be displayed on the display 1 to a user's operation accepting screen including, for example, the buttons 401. Further, in the user interface control processing, when the transition to the stand-by mode occurs (step 214), the flow returns to step 202 as it is without performing the processing in step 216. Meanwhile, when the transition to the stand-by mode occurs, the information processing unit 6 returns the screen to be displayed on the display 1 from the user's operation accepting screen to the screen for not accepting the operation.

Figure 4C:
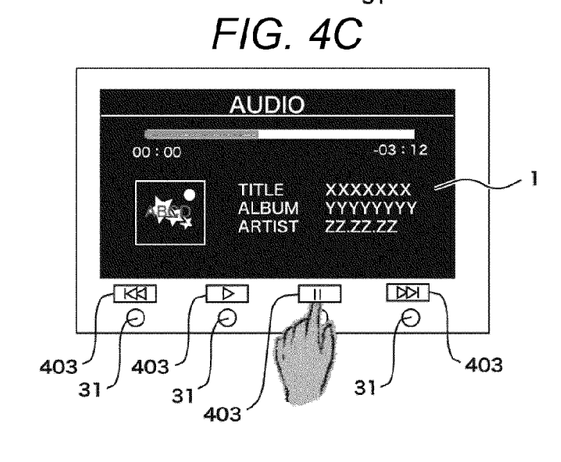
Figure 4D:
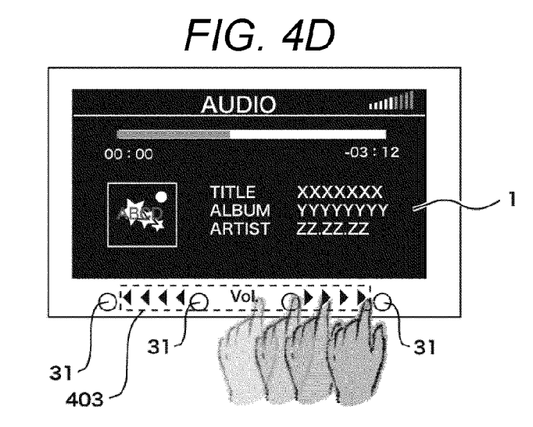

Further, in the above embodiment, when a user's operation accepted using the proximity sensor 3 is fixed to a single operation, the information processing unit 6 which is notified that detection of proximity occurs does not need to change the screen to be displayed on the display 1 to the user's operation accepting screen including, for example, the above buttons 401. In this case, in step 212 of the user interface control processing, detection of the fixed user's operation from the coordinate detected by the input detecting unit 4 and notification of the detected user's operation to the information processing unit 6 are performed. Further, in this case, as illustrated in FIGS. 4C and D, indications 403 indicating contents of user's operations accepted using the proximity sensor 3 (control of a playback operation of a piece of music with an example in FIG. 4C and an increase or a decrease of the volume with an example in FIG. 4D) may be printed or indicated using labels or concavities and convexities near the display screen of the display 1.

Furthermore, in the above embodiment, the electronic device may have the proximity sensor 3 and, in addition, another input device such as a touch panel arranged on the display screen of the display 1, and the user interface control unit 5 may use the proximity sensor 3 and another input device in combination to accept the user's operation.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An electronic device comprising:
   a display;
   a proximity sensor arranged near a display surface of the display and configured to provide an output signal corresponding to a degree of proximity of an object to the display surface, and also configured to provide a position of the approaching object in a direction horizontal to the display surface;
a user interface control unit having a first operational mode and a second operational mode;
wherein the user interface control unit, in the first operation mode, is configured to monitor proximity of a user's hand from the display surface based on the output signal of the proximity sensor, and when it is determined that the user's hand is within a first predetermined distance from the display surface, the user interface control unit changes a display state of the display and sets the second operational mode, whereas if it is not determined that the user's hand is within the first predetermined distance from the display surface, the user interface control unit does not set the second operational mode, and
wherein when the user interface control unit, in the second operational mode, detects a position of the user's hand in a direction horizontal to the display surface within a detection target range in which a distance to the display surface is equal to or less than a second predetermined distance, the user interface control unit accepts the user's operation according to the detected position of the user's hand or a change in the position of the user's hand, whereas if it is not detected that the position of the user's hand is equal to or less than the second predetermined distance, the user interface control unit does not accept the user's operation according to the detected position of the user's hand or a change in the position of the user's hand, and wherein the second predetermined distance is less than the first predetermined distance.

2. The electronic device according to claim 1, wherein in the first operational mode, an initial state of the display is a stopped state, and the user interface control unit activates the display when the user's hand is detected to be within the first predetermined distance from the display surface.

3. The electronic device according to claim 2, wherein an indication of a content of the user's operation is accepted based on the detected position of the user's hand or a change in the position of the user's hand near the display surface.

4. The electronic device according to claim 1, wherein when the user interface control unit is in the first operational mode and determines that the user's hand is within the first predetermined distance from the display surface, the user interface control unit displays a user's operation accepting screen on the display and sets the second operational mode, and
wherein in the second mode, the user interface control unit detects a position of the user's hand in a direction horizontal to the display surface within a detection target range in which a distance to the display surface is equal to or less than a second predetermined distance, the user interface control unit accepts the user's operation according to the detected position of the user's hand or a change in the position of the user's hand.

5. The electronic device according to claim 4, wherein:
the proximity sensor outputs an output signal corresponding to a degree of proximity of the object to the display surface and a position of the object approaching in left and right directions relative to the display surface;
the user interface control unit displays a screen in which a button for accepting a user's selecting operation is displayed as the user's operation accepting screen; and
in the second mode, the user interface control unit detects a position of the user's hand in the left and right directions relative to the display surface based on the output signal of the proximity sensor and, when the detected position of the user's hand coincides with a display position of the button, the user interface control unit accepts the user's selecting operation with respect to the button.

6. The electronic device according to claim 4, wherein:
the proximity sensor outputs an output signal matching the degree of the proximity of the object to the display surface of the display and a position of the approaching object in left and right directions relative to the display surface; and
the user interface control unit displays a screen in which an object for accepting a user's swiping operation is arranged as the user's operation accepting screen, and, in the second mode, the user interface control unit detects a position of the user's hand in the left and right directions relative to the display surface using the output signal of the proximity sensor and, when the position of the detected hand in the left and right directions changes in the left and right directions within a display range of the object in the left and right directions, accepts the user's swiping operation with respect to the object.

7. The electronic device according to claim 1, wherein:
the proximity sensor comprises a plurality of spaced apart infrared LEDs arranged in a direction horizontal to the display surface, and a photosensor configured to detect reflected light emitted by the LEDs; and
in the second mode, the user interface control unit detects a position of the user's hand in left and right directions of the display surface of the display using the output signal of the proximity sensor.

8. The electronic device according to claim 7, wherein:
the proximity sensor comprises four infrared LEDs arranged near corresponding corners of the display surface and a photosensor configured to detect reflected light emitted by the LEDs; and
in the second mode, the user interface control unit detects a position of the user's hand in left and right directions and up and down directions of the display surface of the display using the output signal of the proximity sensor.

9. The electronic device according to claim 1, wherein, in the second mode, the user interface control unit is configured to set a sensitivity level of the proximity sensor lower than a sensitivity level in the first mode.

10. The electronic device according to claim 1, wherein the proximity sensor is an infrared sensor.

11. The electronic device according to claim 1, wherein the proximity sensor is an ultrasonic sensor.

12. The electronic device according to claim 1, wherein the proximity sensor is an electromagnetic sensor.

13. The electronic device according to claim 1, further comprising a touch panel arranged on the display surface of the display,
wherein the user interface control unit accepts the user's operation according to a user's touch operation with respect to the touch panel.

14. A user interface controlling method of controlling a user interface in an electronic device having a display, and a proximity sensor arranged near a display surface of the display, and configured to provide an output signal corresponding to a degree of proximity of an object to the display surface, and also configured to provide a position of the approaching object in a direction horizontal to the display surface, the method comprising:
monitoring, by the electronic device, the proximity of a user's hand within a first predetermined distance from the display surface based on the output signal of the proximity sensor, and determining that the user's hand is within the first predetermined distance from the display surface;

changing a display state of the display when the electronic device determines that the user's hand is within the first distance from the display surface, whereas if it is not determined that the user's hand is within the first predetermined distance from the display surface, the display state of the display is not changed;

detecting, by the electronic device, a position of the user's hand in a direction horizontal to the display surface within a detection target range in which a distance to the display surface is equal to or less than a second predetermined distance; and accepting the user's operation according to the detected position of the user's hand or a change in the position of the user's hand, whereas if it is not detected that the position of the user's hand is equal to or less than the second predetermined distance, a user's operation is not accepted, and wherein the second predetermined distance is less than the first predetermined distance.

15. A non-transitory computer program read and executed by a computer which comprises: a display; and a proximity sensor arranged near a display surface of the display and configured to output an output signal matching a degree of proximity of an object to the display surface of the display and also a position of the approaching object in a direction horizontal to the display surface of the display, the program causing the computer to execute:

a step of monitoring the proximity of a user's hand within a first predetermined distance from the display surface of the display using the output signal of the proximity sensor, and detecting occurrence of the proximity within the first predetermined distance;

a step of, when detecting the proximity within the first predetermined distance, changing a display state of the display whereas if it is not determined that the user's hand is within the first predetermined distance from the display surface, the display state of the display is not changed; and a step of, after detecting the proximity within the first predetermined distance, detecting a position of the user's hand in a direction horizontal to the display surface of the display within a distance range as a detection target range in which a distance to the display surface of the display is equal to or less than a second predetermined distance shorter than the first predetermined distance using the output signal of the proximity sensor, and starting processing of accepting the user's operation according to the position of the detected hand or a change in the position whereas if it is not detected that the position of the user's hand is equal to or less than the second predetermined distance, a user's operation is not accepted.

* * * * *